United States Patent [19]

d/Alayer de Costemore d'Arc

[11] Patent Number: 4,529,149
[45] Date of Patent: Jul. 16, 1985

[54] MINIATURE VIDEO CASSETTE

[75] Inventor: Stephane M. d/Alayer de Costemore d'Arc, Ways, Belgium

[73] Assignee: Staar S.A., Brussels, Belgium

[21] Appl. No.: 424,557

[22] Filed: Sep. 27, 1982

[30] Foreign Application Priority Data

Dec. 1, 1981 [BE] Belgium ............................... 891311

[51] Int. Cl.³ .............................................. G03B 1/04
[52] U.S. Cl. ................................................. 242/199
[58] Field of Search ............................. 242/199, 200

[56] References Cited

U.S. PATENT DOCUMENTS

| 3,610,551 | 10/1971 | Protas | 242/199 |
| 4,168,043 | 9/1979 | Shiba | 242/199 |
| 4,302,787 | 11/1981 | Itani | 242/199 X |
| 4,399,960 | 8/1983 | Shoji | 242/199 |

FOREIGN PATENT DOCUMENTS 891249  3/1982 Belgium .
891250  3/1982 Belgium .

Primary Examiner—Stuart S. Levy
Assistant Examiner—David Werner
Attorney, Agent, or Firm—Leydig, Voit, Osann, Mayer and Holt, Ltd.

[57] ABSTRACT

A miniature cassette is disclosed comprising a casing having two rotatable spools for storing magnetic tape, guide rollers mounted in the casing for guiding the tape in different paths between the spools, and apertures in the end walls of the casing allowing the tape to exit from and enter into the casing along different paths between the spools wherein one of the paths is substantially perpendicular to the end walls of the casing.

4 Claims, 3 Drawing Figures

MINIATURE VIDEO CASSETTE

TECHNICAL FIELD

The present invention relates to video apparatus and, more particularly, to video cassettes of magnetic tape for recording and playing video programs.

BACKGROUND ART

The great majority of video recorder/player apparatus presently on the market use large standard video cassettes having recording capacities of several (4 to 6) hours.

Some portable video cameras make video recordings using a recorder which is integrated with the camera and which uses miniature video cassettes. Miniature video cassettes cannot be played in most video recorder/player apparatus, however, and recordings made thereon must be re-recorded on tape of a standard video cassette in order to be used in such apparatus.

The magnetic tape in standard video cassettes follows a well-defined path as it must cooperate with drive, reproduction and/or recording members. As a general rule, a portion of the path is straight and elongated and extends adjacent one longer edge of the video cassette to ensure that the tape is exposed over practically the entire length of the cassette so as to enable a loading device to remove the tape from the cassette and place it against the recording and playback members when the cassette is in the operative position.

Since, by their very nature, miniature video cassettes are very much smaller than standard video cassettes, the magnetic tape which they contain does not have the same path arrangement as in the standard video cassettes, as a result of which they cannot be used in conventional video recorder/player apparatus.

Portable recorders using miniature video cassettes, accordingly, have not come into widespread use owing to the incompatibility of the miniature video cassettes with video apparatus intended for use with standard video cassettes.

DISCLOSURE OF THE INVENTION

The principal object of the present invention is to overcome these disadvantages encountered in the use of miniature video cassettes by providing miniature video cassettes especially suited for use in an adapter of the same dimension and shape as a large standard video cassette and in which the miniature video cassettes can be inserted and then played using conventional video recorder/player apparatus.

Another object is to provide an internal construction of such miniature video cassettes which permits the magnetic tape contained in the miniature cassettes to follow the same path as in standard cassettes once a miniature cassette is correctly positioned in the adapter.

BRIEF DESCRIPTION OF THE DRAWINGS

Further features and advantages of the invention will be apparent from the following description taken in conjunction with the accompanying drawings, in which.

BEST MODE FOR CARRYING OUT THE INVENTION

Referring to the Figures, a miniature video cassette 10 is illustrated having spools 12A, 12B for storing magnetic tape 13 with hubs 14A, 14B for receiving drive spindles adapted to be driven to transfer the tape from one spool to the other. The miniature video cassette 10 has an outside configuration and dimensions to be received in the recording unit of portable video cameras of well known type and the spools, hubs and tape are conventional. In this case, it is preferred that the miniature video cassette 10 have a size such that a length of magnetic tape may be wound on one spool providing a recording time for about one-half hour of video, as compared with six to eight hours on a standard video cassette. Of course, the length of tape may vary, depending upon the specific spool size and thickness of tape.

The miniature video cassette 10 is constructed not only to be received in the recorder unit of a portable video camera but, according to this invention, also to have a construction such that it may be received and cooperate with an adapter having a housing with external dimensions substantially identical to the dimensions of a standard large video cassette and by means of which the tape of the miniature video cassette may be recorded on or played back in a conventional video apparatus designed to receive standard large video cassettes. Such an adapter is described in detail in copending application Ser. No. 424,556, filed Sept. 27, 1982 and entitled Adapter For Video Cassette.

Figure 1:
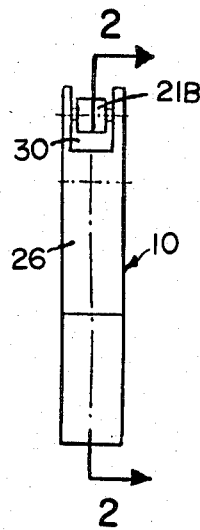
FIG. 1 is an end view of a miniature video cassette constructed according to the invention.
Figure 2:
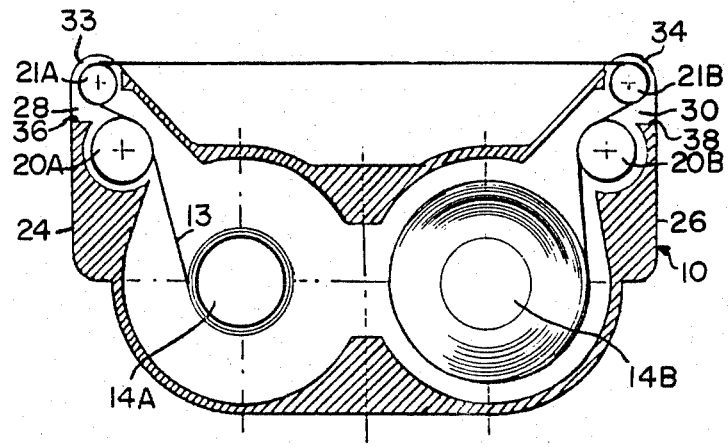
FIG. 2 is a sectional view taken substantially in the plane of lines 2—2 of FIG. 1 showing the normal path of the tape.
Figure 3:
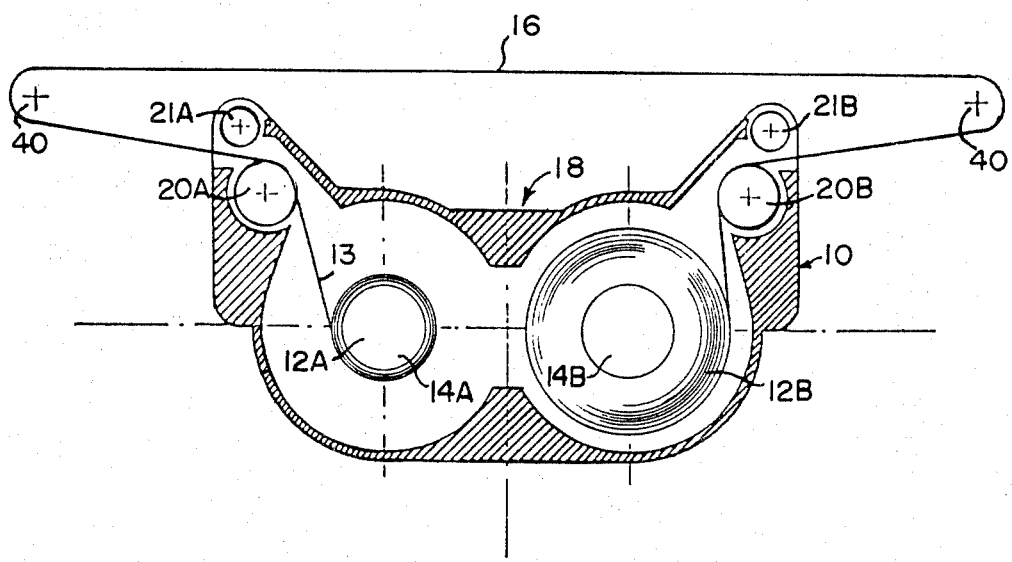
FIG. 3 is a similar view to FIG. 2, the path of the tape including a large loop outside the miniature cassette with a straight portion and being similar to the path of tape in a standard cassette of large dimensions.

To this end, in keeping with the invention, the miniature video cassette 10 has a construction in which the tape 13 can be recorded or played back when extending from the miniature cassette along either (1) a short path (FIG. 2) or (2) a long path (FIG. 3 of travel. Thus, in normal operation, when in the recording unit of a camera, the tape 13 has a normal path in which it extends from the cassette along a short path (FIG. 2) of travel and is adapted to cooperate with drive and recording elements of the video camera. When in the adapter, the tape 13 extends from the cassette along a long path of travel, having a straight section 16, as shown in FIG. 3, extending substantially parallel to one edge 18 of the cassette. In this configuration, the tape 13 is adapted to cooperate with drive and recording or reproducing elements of video apparatus.

It will be clear that along either the short or long path of movement, the tape 13 must freely exit from and enter the cassette 10 under all conditions, ranging from empty to full spools of tape, which affects the exit or entry point because of the change in diameter on tape on the spools.

In carrying out this invention, the miniature video cassette is provided with two pairs of rollers 20A, 21A, 20B, 21B, each pair being associated with one of the spools 12A, 12B. The tape 13 extends from the spools and is trained from one pair of rollers to the other, each pair of rollers including an inward roller 20A, 20B that is contacted by the tape connected to the associated spool and an outward roller 21A, 21B. As shown in FIG. 2, in keeping with the invention, the tape 13, when trained along the short path (FIG. 2), contacts both rollers of each pair being trained over the inner side of the inward rollers 20A, 20B and the outer side of the outward rollers 21A, 21B. In the short path, the tape is trained over and extends between the outward rollers 21A, 21B.

Further in carrying out the invention, the end walls 24, 26 of the cassette 10 have apertures 28, 30 providing clearance for the tape 13 to assume a different angular position relative to the inward rollers 20A, 20B when exiting or entering the cassette. As shown in FIG. 2, along the short path of travel, the tape 13 is trained around the outward rollers 21A, 21B, which serve as guide rollers, and exits (or enters) in a direction toward the opposite end of the cassette. As shown in FIG. 3, along the long path of travel, the inward rollers 20A, 20B are used as guide rollers and the tape exits (or enters) through the end walls 24, 26 of the cassette in a direction away from the opposite end of the cassette and essentially perpendicular to the end walls. The apertures 28, 30 in the end walls which permit the tape to exit or enter in a substantially perpendicular direction extend from the front edge 33, 34 of the cassette to points 36, 38 substantially opposite the forwardmost point of the periphery of the inward rollers 20A, 20B so that the tape can exit or enter in a substantially perpendicular direction and form a large loop, as shown in FIG. 3, or be retracted and trained around the outward rollers. The tape can be extended from the small to the large loop, or retracted from the large to the small loop, and the apertures 28, 30 in the end walls 24, 26 provide clearance. As also indicated in FIG. 3, when extending in the long path, the tape 13 is in contact with the inward rollers 20A, 20B and free of contact with the outward rollers 21A, 21B, being supported by guide means 40 in the adapter to form the large loop with an elongated, straight portion 16 extending parallel to the front edge of the miniature cassette.

In the adapter, the tape is trained around the same number of rollers to form the long path of travel as in the miniature cassette to form the short path of travel, herein shown as two rollers at each end of the path of travel. In the short path of travel, the two rollers at each end of the path are located within the cassette; in the long path of travel, one roller at each end is provided within the cassette and the second roller is provided by the adapter outside the cassette.

While reference has been made herein to the use of rollers for guiding the tape, such rollers may be fixed in position, providing smooth curved guide surfaces over which the tape travels in the long path or short path of movement. Other variations may be made without departing from the spirit of the invention as expressed in the appended claims.

I claim:

1. A miniature cassette comprising:
   a casing having opposite end walls,
   two spools rotatably mounted in said casing for storing a length of magnetic tape attached at both ends to and wound around said spools,
   tape guide means mounted adjacent said opposite end walls of said casing for guiding said tape in paths between said spools including a short path wherein said tape exits from one guide means in a direction toward the opposite end wall and a long path wherein said tape exits from one guide means in a direction away from and substantially perpendicular to the opposite end wall, and
   said end walls having apertures providing clearance with said casing for said tape to exit from and enter into said casing along said short and long paths, said guide means adjacent each of said opposite ends walls providing guide surfaces for guiding the tape into the short and long paths as the tape exits from the casing.

2. A miniature cassette comprising:
   a casing having opposite end walls,
   two spools rotatably mounted in said casing for storing a length of magnetic tape attached at both ends to and wound around said spools,
   tape guide means mounted adjacent said opposite end walls of said casing for guiding said tape in paths between said spools including a short path wherein said tape exits from one guide means in a direction toward the opposite end wall and a long path wherein said tape exits from one guide means in a direction away from the opposite end wall,
   said guide means comprising a pair of guide rollers provided in said casing at each end of said cassette including an inward and an outward guide roller mounted adjacent each end of said casing, said tape contacting said inward roller and being trained around said outward roller in its short path of travel and being free of contact with said outward roller in its long path of travel, and
   said end walls having apertures for said tape to exit from and enter into said casing along said short and long paths, said guide means adjacent each of said opposite ends walls providing guide surfaces for guiding the tape into the short and long paths as the tape exits from the casing.

3. A miniature cassette comprising:
   a casing having opposite end walls,
   two spools rotatably mounted in said casing for storing a length of magnetic tape attached at both ends to and wound around said spools,
   tape guide means mounted adjacent said opposite end walls of said casing for guiding said tape in paths between said spools including a short path wherein said tape exits from one guide means in a direction toward the opposite end wall and a long path wherein said tape exits from one guide means in a direction away from and substantially perpendicular to the opposite end wall,
   said guide means including a pair of rollers adjacent each end of said cassette, each pair including an inward roller and an outward roller, said tape contacting both rollers in said short path and only one of said rollers in said long path, said long path extending substantially perpendicular to the end walls of said casing, and
   said end walls having apertures for said tape to exit from and enter into said casing along said short and long paths, said guide means adjacent each of said opposite ends walls providing guide surfaces for guiding the tape into the short and long paths as the tape exits from the casing.

4. A miniature cassette comprising a casing having two rotatable spools for storing magnetic tape, tape guide rollers mounted at opposite ends of said casing for guiding the tape in different paths between said spools including a short path wherein said tape exits from one end of the casing in a direction toward the opposite end of the casing and a long path wherein said tape exits from one end of the casing in a direction away from the opposite end of the casing, and apertures in said ends of the casing allowing the tape to exit from and enter into the casing along said short and long paths between the spools wherein said tape in said long path exits from and enters into the casing in substantially the opposite direction from the short path, said guide means at each of said opposite ends providing guide surfaces for guiding the tape into said different paths as the tape exits from the casing.

* * * * *